United States Patent [19]
Kriegshauser et al.

[11] Patent Number: 5,999,884
[45] Date of Patent: Dec. 7, 1999

[54] METHOD FOR DETERMINING THE AXIAL POSITION OF FORMATION LAYER BOUNDARIES USING MEASUREMENTS MADE BY A TRANSVERSE ELECTROMAGNETIC INDUCTION LOGGING INSTRUMENT

[75] Inventors: Berthold F. Kriegshauser; Pravin Gupta; Zeljko Jericevic; Otto N. Fanini, all of Houston, Tex.

[73] Assignee: Western Atlas International, Inc., Houston, Tex.

[21] Appl. No.: 09/044,741

[22] Filed: Mar. 19, 1998

Related U.S. Application Data

[63] Continuation-in-part of application No. 08/686,848, Jul. 26, 1996, Pat. No. 5,781,436.

[51] Int. Cl.$^6$ .................................................. G01V 3/38
[52] U.S. Cl. ............................................................ 702/7
[58] Field of Search ....................... 702/7; 324/338–343

[56] References Cited

U.S. PATENT DOCUMENTS

| | | | |
|---|---|---|---|
| 5,075,625 | 12/1991 | Augustin et al. | 702/7 |
| 5,184,079 | 2/1993 | Barber | 324/339 |
| 5,210,691 | 5/1993 | Freedman et al. | 702/7 |

OTHER PUBLICATIONS

Doll, H.G., Introduction to Induction Logging and Application to Logging Of Wells Drilled with Oil Based Mud, Journal of Petroleum Technology, vol. 1, Society of Petroleum Engineers, Richardson, TX (1949), Feb. 1949, pp. 96–110.

Tabarovsky, L.A., and Epov, M.I., Geometric and Frequency Focusing in Exploration of Anisotropic Seams, Nauka, USSR Academy of Science, Siberian Division, Novosibirsk, (1972), pp. 1–62.

Weaver, H.J., Applications of Discrete and Continuous Fourier Analysis, The Discrete Fourier Transform, A Wiley–Interscience publication, Canada (1983), pp. 90, 91, 96–99.

*Primary Examiner*—Donald E. McElheny, Jr.
*Attorney, Agent, or Firm*—Richard A. Fagin

[57] ABSTRACT

A method for estimating axial positions of formation layer boundaries from transverse electromagnetic induction signals. A first derivative is calculated with respect to depth of the induction signals. A second derivative of the signals is calculated. The second derivative is muted. Layer boundaries are selected at axial positions where the muted second derivative is non zero, and the first derivative changes sign. The selected boundaries are thickness filtered to eliminate boundaries which have the same axial spacing as the spacing between an induction transmitter and receiver used to measure the induction signals, and to eliminate boundaries having a spacing less than an axial resolution of the induction signals. In a preferred embodiment, the process is repeated using transverse induction measurements made at another alternating current frequency. Layer boundaries selected in both frequencies are determined to be the layer boundaries. An alternative embodiment includes Fourier transforming the induction signals into the spatial frequency domain, low pass filtering the Fourier transformed signals at a band limit about equal to the axial resolution of the induction signals, calculating a central first derivative of the filtered, Fourier transformed signals, calculating an inverse Fourier transform of the central first derivative, determining roots of the inverse Fourier transform, and testing localized properties of the inverse Fourier transform within a selected number of data sample points of the selected roots, thereby providing indications of formation layer boundaries at axial positions most likely to be true ones of the formation layer boundaries.

6 Claims, 10 Drawing Sheets

METHOD FOR DETERMINING THE AXIAL POSITION OF FORMATION LAYER BOUNDARIES USING MEASUREMENTS MADE BY A TRANSVERSE ELECTROMAGNETIC INDUCTION LOGGING INSTRUMENT

CROSS-REFERENCE TO RELATED APPLICATIONS

This application is a continuation-in-part of application Ser. No. 08/686,848 filed on Jul. 26, 1996, entitled, "Method and Apparatus for Transverse Electromagnetic Induction Logging", and assigned to the assignee of this invention, now U.S. Pat. No. 5,781,436.

BACKGROUND OF THE INVENTION

1. Field of the Invention

The invention is related to the field of electromagnetic induction well logging for determining the electrical resistivity of earth formations penetrated by a wellbore. More specifically, the invention is related to methods for processing induction voltage measurements to determine the position of formation layer boundaries for inversion processing.

2. Description of the Related Art

Electromagnetic induction resistivity well logging instruments are well known in the art. Electromagnetic induction resistivity well logging instruments are used to determine the electrical conductivity (and its converse, resistivity) of earth formations penetrated by a wellbore. Measurements of the electrical conductivity are used for, among other things, inferring the fluid content of the earth formations. Typically, lower conductivity (higher resistivity) is associated with hydrocarbon-bearing earth formations.

The physical principles of electromagnetic induction resistivity well logging are described, for example, in, H. G. Doll, *Introduction to Induction Logging and Application to Logging of Wells Drilled with Oil Based Mud*, Journal of Petroleum Technology, vol. 1, p.148, Society of Petroleum Engineers, Richardson Tex. (1949). Many improvements and modifications to electromagnetic induction resistivity instruments have been devised since publication of the Doll reference, supra. Examples of such modifications and improvements can be found, for example, in U.S. Pat. No. 4,837,517, U.S. Pat. No. 5,157,605 issued to Chandler et al, and U.S. Pat. No. 5,452,762 issued to Beard et al.

A limitation to the electromagnetic induction resistivity well logging instruments known in the art is that they typically include transmitter coils and receiver coils wound so that the magnetic moments of these coils are substantially parallel only to the axis of the instrument. Eddy currents are induced in the earth formations from the magnetic field generated by the transmitter coil, and in the induction instruments known in the art these eddy currents tend to flow in ground loops which are substantially perpendicular to the axis of the instrument. Voltages are then induced in the receiver coils related to the magnitude of the eddy currents. Certain earth formations, however, consist of thin layers of electrically conductive materials interleaved with thin layers of substantially non-conductive material. The response of the typical electromagnetic induction resistivity well logging instrument will be largely dependent on the conductivity of the conductive layers when the layers are substantially parallel to the flow path of the eddy currents. The substantially non-conductive layers will contribute only a small amount to the overall response of the instrument and therefore their presence will typically be masked by the presence of the conductive layers. The non-conductive layers, however, are the ones which are typically hydrocarbon-bearing and are of the most interest to the instrument user. Some earth formations which might be of commercial interest therefore may be overlooked by interpreting a well log made using the electromagnetic induction resistivity well logging instruments known in the art.

One solution to the limitation of the induction instruments known in the art is to include a transverse transmitter coil and a transverse receiver coil on the induction instrument, whereby the magnetic moments of these transverse coils is substantially perpendicular to the axis of the instrument. Such as solution was suggested in, L. A. Tabarovsky and M. I. Epov, *Geometric and Frequency Focusing in Exploration of Anisotropic Seams*, Nauka, USSR Academy of Science, Siberian Division, Novosibirsk, pp. 67–129 (1972). Tabarovsky and Epov suggest various arrangements of transverse transmitter coils and transverse receiver coils, and present simulations of the responses of these transverse coil systems configured as shown therein. Tabarovsky and Epov also describe a method of substantially reducing the effect on the voltage induced in transverse receiver coils which would be caused by eddy currents flowing in the wellbore. The wellbore is typically filled with a conductive fluid known as drilling mud. Eddy currents which flow in the drilling mud can substantially affect the magnitude of voltages induced in the transverse receiver coils. The wellbore signal reduction method described by Tabarovsky and Epov can be described as "frequency focusing", whereby induction voltage measurements are made at more than one frequency, and the signals induced in the transverse receiver coils are combined in a manner so that the effects of eddy currents flowing within certain geometries, such as the wellbore, can be substantially eliminated from the final result. Tabarovsky and Epov, however, do not suggest any configuration of signal processing circuitry which could perform the frequency focusing method suggested in their paper.

A device which can measure "frequency focused" transverse induction measurements is described in co-pending patent application Ser. No. 08/686,848 filed on Jul. 26, 1996, U.S. Pat. No. 5,781,436, entitled, "Method and Apparatus for Transverse Electromagnetic Induction Logging", and assigned to the assignee of this invention. Using measurements made from conventional induction logging instruments such as described in U. S. Pat. No. 4,837,517, U.S. Pat. No. 5,157,605 issued to Chandler et al, and U.S. Pat. No. 5,452,762 issued to Beard et al typically involves a process known as inversion. Inversion includes generating an initial estimate of the probable spatial distributions of resistivity around the logging instrument, and using the estimated spatial distribution to generate an expected response of the particular logging instrument given the estimated spatial distribution of resistivity. Differences between the expected response and the measured response are used to adjust the model of spatial distribution. The adjusted model of spatial distribution is then used to generate a new expected instrument response. The new expected response is then compared to the measured response. This process is repeated until the difference between the expected response and the measured response reaches a minimum. The apparent spatial distribution of resistivity which generates this "closest" expected response is deemed to be the distribution which most accurately represents the spatial distribution of resistivities in the earth formations surveyed by the induction logging instrument. See for example U.S. Pat. No. 5,703,773 issued to Tabarovsky et al.

Inversion methods for processing signals such as from the instrument described in patent application Ser. No. 08/686,848 generally require an initial estimate of the axial location (depth position) of the boundaries between layers of the earth formation. Initial estimates can be made from various well log measurements such as gamma ray radiation or spontaneous potential. Gamma ray and spontaneous potential-based methods for determining boundary positions tend to have a relatively high incidence of failure to locate boundaries or falsely indicating the presence of a boundary where the contrast in formation resistivity is unlikely to have a material effect on the response of an induction resistivity instrument.

SUMMARY OF THE INVENTION

The invention is a method for estimating the axial (depth) positions of formation layer boundaries from transverse electromagnetic induction signals measured at a selected frequency. A first derivative is calculated with respect to depth of the transverse induction signals. A second derivative with respect to depth is calculated of the transverse induction signals. The second derivative with respect to depth is muted by "zeroing" all values falling below a predetermined threshold. Layer boundaries are selected at axial positions where the muted second derivative is not equal to zero, and where the first derivative changes sign. The selected layer boundaries are then "thickness filtered" to eliminate ones of the selected boundaries which have the same axial spacing as an axial spacing between an induction transmitter and an induction receiver used to measure the transverse induction signals, and the selected boundaries are filtered to eliminate ones of the selected boundaries having an axial spacing less than an axial resolution of the transverse electromagnetic induction signals.

In a preferred embodiment of the invention, the process of calculating first and second derivatives is repeated using transverse induction signals measured at an alternating current frequency different from the selected frequency. Layer boundaries thus selected which appear in the processed induction signals measured at both frequencies are determined to be the layer boundaries. The process can be repeated for transverse induction measurements made at a plurality of different frequencies to improve the reliability of the results.

An alternative embodiment of the invention includes processing transverse electromagnetic induction signals measured at a selected frequency. The processing includes Fourier transforming the induction signals into the spatial frequency domain, low pass filtering the Fourier transformed signals at a band limit about equal to an axial resolution of the induction signals, calculating a central first derivative of the low pass filtered Fourier transformed signals, calculating an inverse Fourier transform of the central first derivative, determining and selecting roots of the inverse Fourier transformed central first derivative, and testing localized properties of the inverse Fourier transformed central first derivative within a selected number of data sample points of the selected roots, thereby providing indications of formation layer boundaries at axial positions most likely to be true ones of the formation layer boundaries. The process of the alternative embodiment may be repeated using transverse induction signals measured at a different alternating current frequency.

DESCRIPTION OF THE PREFERRED EMBODIMENT

1. Apparatus for measuring transverse induction signals

Figure 1:
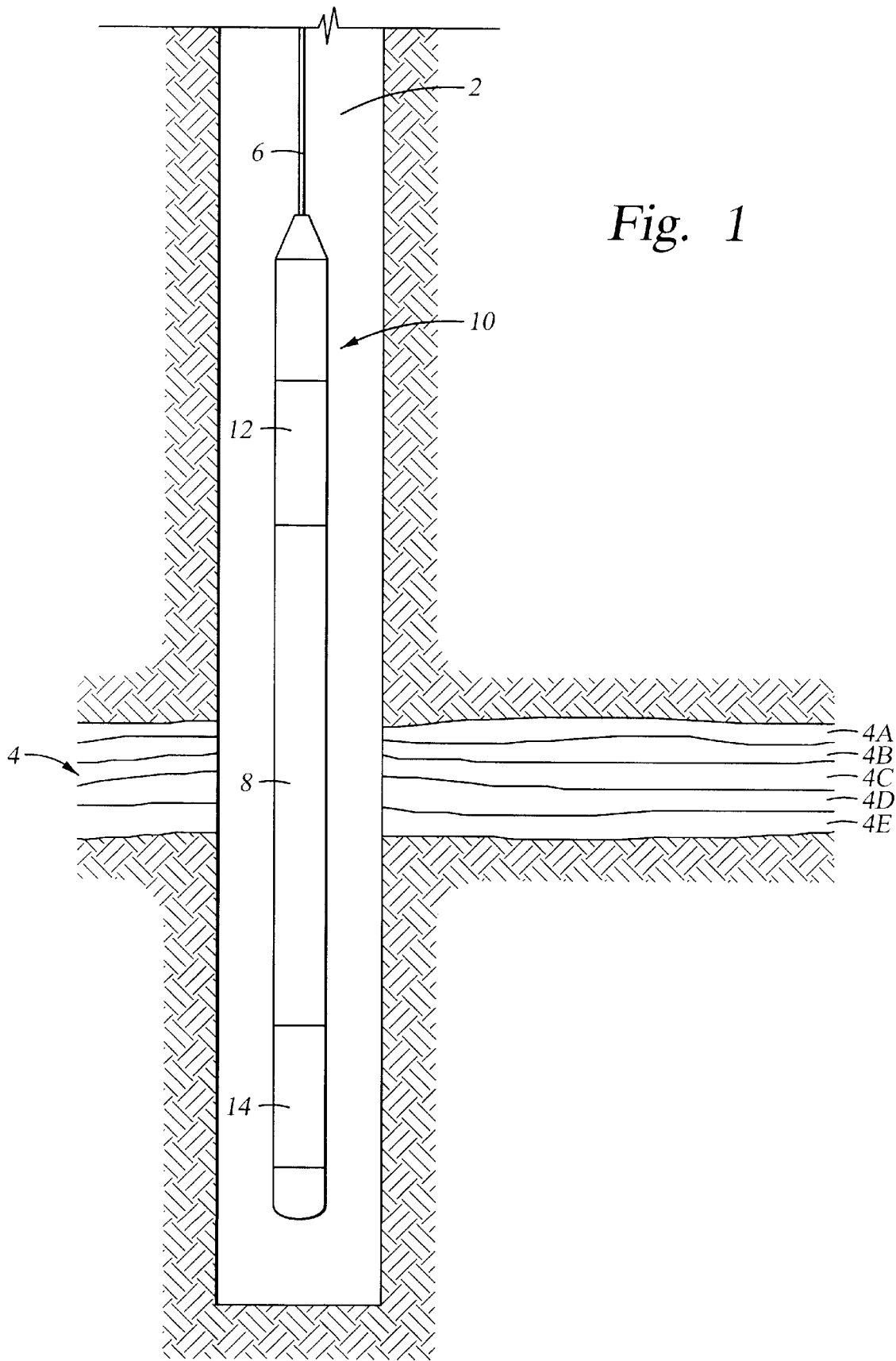
FIG. 1 shows an induction instrument disposed in a wellbore penetrating earth formations.

FIG. 1 shows an electromagnetic induction resistivity well logging instrument 10 disposed in a wellbore 2 drilled through earth formations. The earth formations are shown generally at 4. The instrument 10 can be lowered into and withdrawn from the wellbore 2 by means of an armored electrical cable 6 or similar conveyance known in the art. The instrument 10 can be assembled from three subsections: an auxiliary electronics unit 14 disposed at one end of the instrument 10; a coil mandrel unit 8 attached to the auxiliary electronics unit 14; and a receiver/signal processing/telemetry electronics unit 12 attached to the other end of the coil mandrel unit 8, this unit 12 typically being attached to the cable 6.

The coil mandrel unit 8 includes induction transmitter and receiver coils, as will be further explained, for inducing electromagnetic fields in the earth formations 4 and for receiving voltage signals induced by eddy currents flowing in the earth formations 4 as a result of the electromagnetic fields induced therein.

The auxiliary electronics unit 14, as will be further explained, can include a signal generator and power amplifiers to cause alternating currents of selected frequencies to flow through transmitter coils in the coil mandrel unit 8.

The receiver/signal processing/telemetry electronics unit 12, as will be further explained, can include receiver circuits for detecting voltages induced in receiver coils in the coil mandrel unit 8, and circuits for processing these received voltages into signals representative of the conductivities of various layers, shown as 4A through 4F of the earth formations 4. As a matter of convenience for the system designer, the receiver/signal processing/telemetry electronics unit 12 can include signal telemetry to transmit the conductivity-related signals to the earth's surface along the cable 6 for further processing, or alteratively can store the conductivity related signals in an appropriate recording device (not shown) for processing after the instrument 10 is withdrawn from the wellbore 2.

Figure 2:
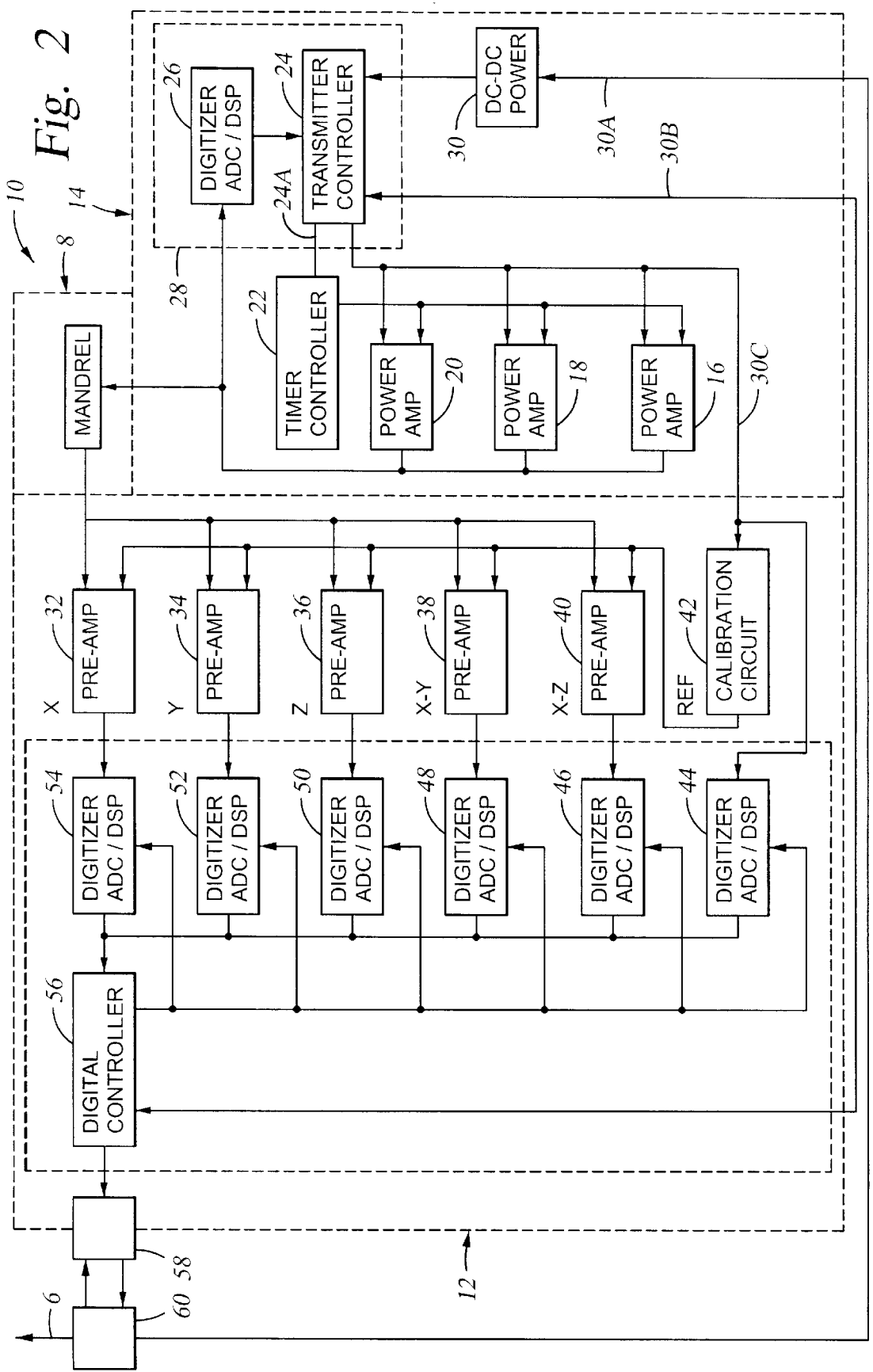
FIG. 2 shows a functional block diagram of the induction instrument of the invention.

The electrical configuration of the instrument 10 can be better understood by referring to a functional block diagram of the instrument 10 shown in FIG. 2. The auxiliary electronics unit 14 can include a transmitter controller 24 and a combination analog to digital converter/digital signal processing unit (ADC/DSP) 26, both of which are preferably enclosed in a thermal insulating flask 28. The flask 28 can be of a type known in the art and is provided to maintain stable temperature, and consequently stable frequency, of the transmitter controller 24 and ADC/DSP 26. The transmitter controller 24 and ADC/DSP 26 preferably receive electrical power from a DC-DC converter 30. The electrical power is preferably conducted along a power line 30A as direct current, so that as the power passes through the mandrel unit 8 on the way to the auxiliary electronics unit 14 the electrical power will not materially increase the amount of stray voltage induced in coils in the mandrel unit 8. The transmitter controller 24 can include a signal generator, which will be further explained, for generating an alternating voltage signal at two different frequencies. An analog signal output 24A of the transmitter controller 24 can be connected to a timer controller 22 which selectively operates, at an appropriate time as will be further explained, each of three power amplifiers 16, 18, 20. The output of each of the power amplifiers 16, 18, 20 is connected to one corresponding transmitter coil set (not shown in FIG. 2) in the mandrel unit 8.

The ADC/DSP 26 can be connected to a reference tap on the output of each power amplifier 16, 18, 20. A portion of the current flowing through each transmitter coil (located in the mandrel unit 8) from power amplifiers 16, 18, 20 is conducted provide a transmitter current reference for the transmitter controller 24, and for receiver circuits located in the receiver/signal processing/telemetry electronics unit 12, as will be further explained. The current so detected can be digitized in the ADC/DSP 26 to provide the transmitter current reference in digital form to the transmitter controller 24. The use of the transmitter current reference will be further explained.

The receiver/signal processing/telemetry electronics unit 12 can include preamplifiers 32, 34, 36, 38, 40 each of which is connected to one of the receiver coil sets (which will be further explained) in the coil mandrel unit 8. The output of each preamplifier can be connected to a corresponding analog-to-digital converter/digital signal processor (ADC/DSP), shown as 54, 52, 50, 48, 46 wherein the output of each preamplifier 32, 34, 36, 38, 40 is digitized and processed into a signal corresponding to the voltages induced in the corresponding receiver coil (not shown in FIG. 2) to which each preamplifier is connected. Timing of operation for the ADC/DSP circuits 54, 52, 50, 48, 46 can be provided by a controller 56. Preferably, controller 56 operates the ADC/DSP circuits 54, 52, 50, 48, 46 so that digital signal samples are made by the ADC portion of each ADC/DSP circuit at a predetermined time with respect to the generation of the alternating current flowing through the transmitter coils. The time can be determined by a clock and synchronization signals conducted over control line 30B from the transmitter controller 24. The controller 56 preferably times digitization from each ADC/DSP circuit so that the digital samples are synchronized with respect to the same signal phase in each cycle of the alternating voltage induced in each receiver coil. In this manner, the signal samples can be synchronously stacked to reduce noise in the signal output from each ADC/DSP circuit. A method of synchronous stacking signal digital signal samples to reduce noise is described in U.S. Pat. No. 5,452,762 issued to Beard et al. The ADC/DSP circuits 54, 52, 50, 48, 46 in the receiver/signal processing/telemetry electronics unit 12 can be similar in design to the ADC/DSP 26 in the auxiliary electronics unit 8 as a matter of convenience for the system designer.

The receiver/signal processing/telemetry electronics unit 12 can also include a calibration circuit 42 and an associated ADC/DSP circuit 44 connected thereto. A portion of the alternating current signal used to drive the power amplifiers 16, 18, 20 can be conducted to the calibration circuit 42 over analog signal line 30C. Analog signal line 30C is preferably electrostatically shielded to reduce parasitic induction of the alternating current signal into the receiver coils in the coil mandrel unit 8. On command from the controller 56, the calibration circuit 42 periodically conducts a sample of the alternating current to each of the receiver preamplifiers 32, 34, 36, 38, 40. Since the alternating current signal thus conducted to the preamplifiers is in each case substantially identical, small differences in response characteristics of each preamplifier can be determined. The alternating current signal conducted to the preamplifiers is also digitized in a separate ADC/DSP 44 to generate a reference signal for determining the response characteristics of each preamplifier. The digitized output of each preamplifier from ADC/DSP's 46–54 is conducted, along with the digitized reference to the controller, where the response of each preamplifier can be determined as the change in the reference signal corresponding to each preamplifier when compared to the reference signal. Any necessary adjustments to the response of the preamplifiers 46–54 may be performed numerically by adjusting the acquisition timing and numerical gain applied to digital samples from each ADC/DSP to match the measured difference in response between the reference signal and the output of each of the preamplifiers 46–54. This response calibration system is provided so that the measurements of the voltages induced in each receiver coil will be less affected by variations in response of each of the preamplifiers.

The controller 56 receives digital signal samples from each ADC/DSP connected to it and calculates the magnitudes of the voltages induced in each one of the receiver coils in the mandrel unit 8 based on the output of the respectively interconnected ADC/DSP's 54, 52, 50, 48, 46, 44. The induced voltage magnitudes thus calculated in the controller 56 may be conducted to a telemetry interface 58 for insertion into a signal telemetry format provided by a telemetry transceiver 60. The telemetry transceiver 60 can transmit signals to the earth's surface corresponding to the calculated magnitudes. Alternatively, magnitude values calculated in the controller 58 may be stored in an appropriate recording device (not shown) for processing after the instrument 10 is withdrawn from the wellbore (2 in FIG. 1).

Figure 3A:
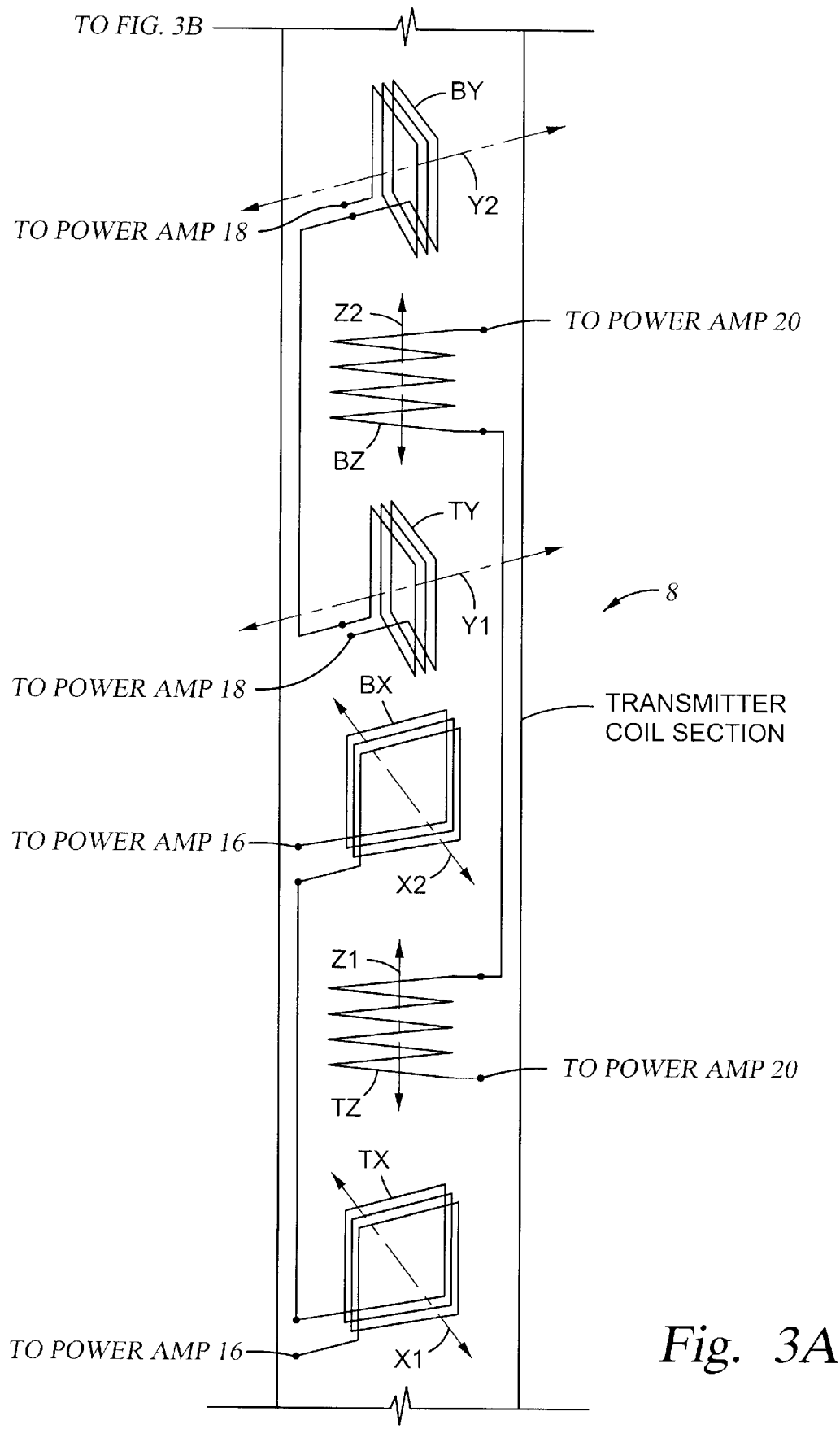
FIG. 3A shows the transmitter coil portion of the coil mandrel unit of the instrument in more detail.
Figure 3B:
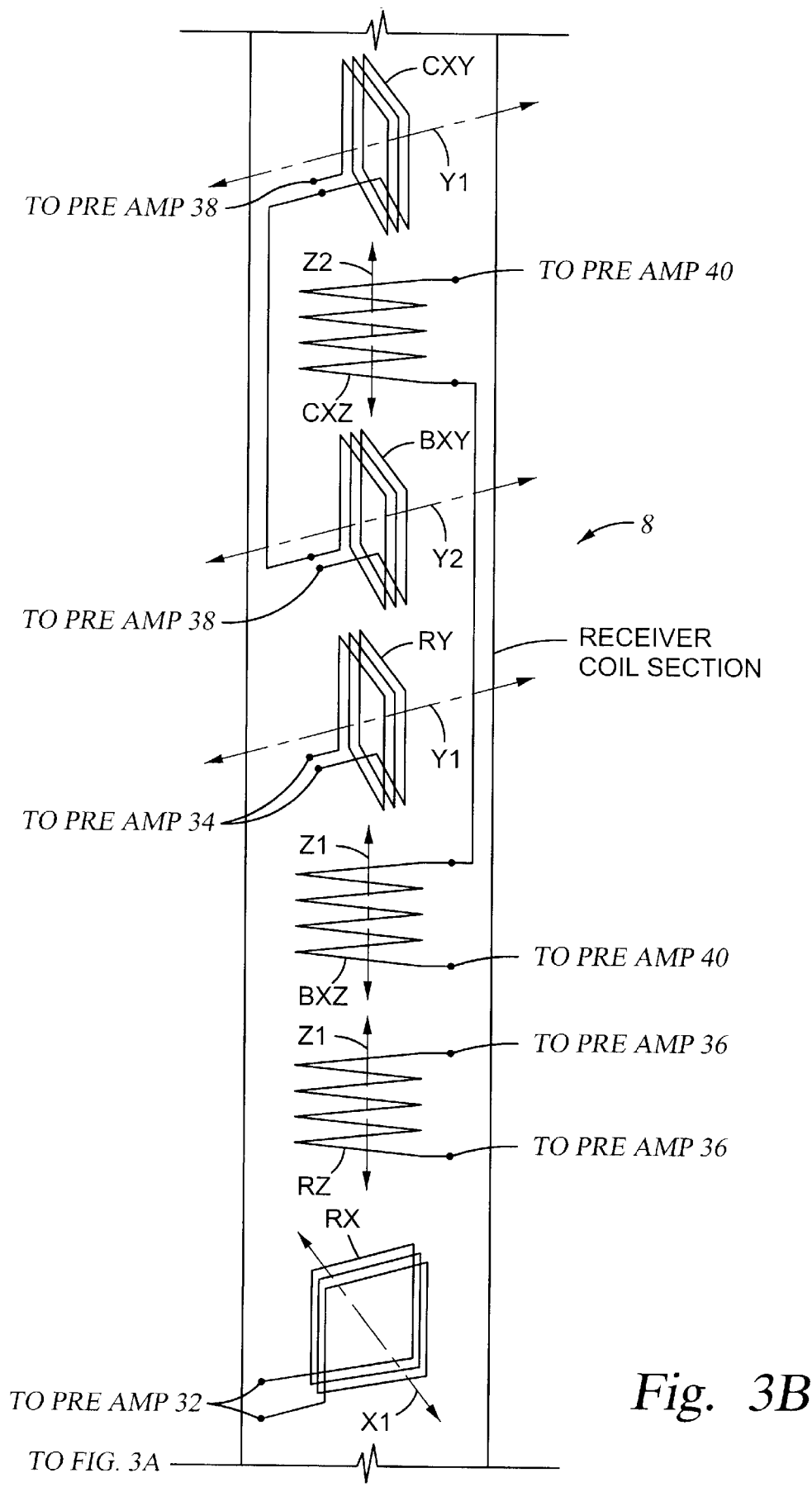
FIG. 3B shows the receiver coil portion of the coil mandrel unit of the instrument in more detail.

The arrangement of transmitter coils and receiver coils on the coil mandrel unit 8 can be better understood by referring to FIGS. 3A and 3B. The transmitter coil section of the coil mandrel unit 8 is shown in FIG. 3A. A transmitter coil which can be wound so that its axis, and thereby its magnetic moment, is along an axis X1 is shown at TX. Axis X1 by convention will be referred to as being parallel to the X-axis. Coil TX is preferably substantially perpendicular to the axis of the instrument (10 in FIG. 1). Coil TX can be electrically connected to the output of one of the power amplifiers (such as 16 in FIG. 2). When alternating current flows through transmitter coil TX, an alternating electromagnetic field is in induced, which causes eddy currents to flow in "ground loops" in the wellbore (2 in FIG. 1) and in the earth formation (4 in FIG. 1) substantially coaxially about axis X1 and parallel to the axis of the mandrel unit 8 and the instrument (10 in FIG. 1).

A short distance along the axis of the coil mandrel unit 8 can be another transmitter coil TZ. Coil TZ can be wound so that it axis Z1 is substantially parallel to the axis of the instrument 10 (which by convention is generally referred to as the Z-axis). Coil TZ can be connected to the output of another one of the power amplifiers (such as 20 in FIG. 2). Alternating current passing through coil TZ induces eddy currents in the wellbore 2 and formation 4 which flow in ground loops substantially coaxial with axis Z1 and substantially perpendicular to the axis of the mandrel unit 8.

Located a short distance further along the axis of the mandrel unit 8 can be a mutual balancing or "bucking" coil BX, corresponding to the X-axis transmitter coil TX. The winding axis X2, and therefore the magnetic moment, of coil BX can be substantially parallel to the axis X1 of coil TX. Coil BX can be series connected in opposite polarity to coil TX, between coil TX and power amplifier 16. Bucking coil TX provides that the output of a corresponding X-axis receiver coil (which will be further explained) is substantially zero when the instrument is disposed in a non-conductive medium such as air. As is understood by those skilled in the art, using "bucking" coils to null the corresponding receiver coil output in a non-conductive environment can be performed either by providing such bucking coils connected in series with the corresponding receiver coil, or alternatively can be connected in series with the transmitter coil. In the present embodiment of the invention it is preferable to provide a bucking coil in series with the corresponding transmitter coil to simplify impedance matching between the corresponding receiver coil and its associated preamplifier (such as 44 in FIG. 2), and thereby to improve the ability of the circuitry associated with each receiver coil to handle signals over a wide frequency range. The reactance of a bucking coil and its associated wiring would complicate impedance matching, and adjusting for signal response characteristics for a wide band response receiver coil, when connected in series with the receiver coil because this reactance is frequently nearly the same as the reactance of the receiver coil.

Still another short distance along the axis of the mandrel unit 8 is a Y-axis transmitter coil TY. Coil TY is preferably wound so that its axis Y1, and therefore its magnetic moment, are substantially perpendicular to both the axis of the instrument 10 and to the magnetic moment of coil TX. Coil TY can be connected to power amplifier 18. Alternating current flowing through coil TY induces a magnetic field which causes eddy currents to flow in the wellbore 2 and the earth formation 4 in ground loops substantially coaxial with axis Y1 and parallel to the axis of the instrument 10. The eddy current ground loops corresponding to coil TY would also be substantially perpendicular to the ground loops associated with coils TX and TZ if the coils TX, TY, TZ are arranged as described herein.

Bucking coils associated with transmitter coils TZ and TY are shown at BZ and BY, respectively. Bucking coils BZ and BY are electrically connected between their respective transmitter coils TZ, TY and power amplifiers 20, 18 in opposite polarity, as is bucking coil BX. Bucking coil BZ is wound to have its axis and magnetic moment along Z2 and BY is wound to have its axis and magnetic moment along Y2. Z2 is substantially parallel to Z1, and Y2 is substantially parallel to Y1.

A suitable arrangement of receiver coils for the invention is shown in FIG. 3B. At the lowermost end of the receiver coil section of the coil mandrel unit 8 can be an X-axis receiver coil RX. Coil RX can be wound so that its sensitive direction is parallel to axis X1 as for transmitter coil TX (shown in FIG. 3A). Eddy currents flowing in ground loops corresponding to coil TX will induce voltages in coil RX proportional in magnitude to the magnitude of the previously explained TX-related eddy currents. The eddy currents themselves are proportional to the electrical conductivity in the path of these ground loops.

A short distance along the axis of the coil mandrel unit 8 is a Z-axis receiver coil RZ wound to have its sensitive direction substantially parallel to Z1, as for its corresponding transmitter TZ. Eddy currents flowing in the previously explained ground loops related to coil TZ will induce voltages in coil RZ proportional to the magnitude of these eddy currents.

The mandrel unit 8 can include a Y-axis receiver coil having a sensitive direction parallel to Y1 and is shown at RY. Eddy currents associated with coil TY will induce similar type voltages in coil RY.

If the layers of the earth formations (4A through 4F in FIG. 1) are substantially perpendicular to the axis of the mandrel unit 8, then measurements made by the Z-axis coils in combination with measurements made by either the X- or Y-axis coils would be sufficient to resolve anisotropy of the conductivity of the earth formations. It is frequently the case, however, that the layers 4A–4F are not perpendicular to the axis of the mandrel unit 8 either because the wellbore (2 in FIG. 1) is inclined from vertical, or the layers 4A–4F are not horizontal (referred to in the art as "dipping beds") or a combination of these two factors. Therefore in order to resolve the anisotropy of the conductivity, the coil mandrel unit 8 of the invention preferably includes cross-axial receiver coils. One such cross-axial receiver coil is shown at CXY. Coil CXY receives voltages induced as a result of eddy current magnetic fields which are parallel to the Y1 axis (parallel to the magnetic moment of the Y-axis transmitter coil TY). These eddy currents may be induced as a result of current flowing through transmitter coil TX. As previously explained, coil TX includes bucking coil BX to null the output of receiver coil RX in a non-conductive environment. Since coil CXY is located at a different axial spacing than coil RX, however, nulling the output of coil CXY would require a bucking transmitter coil located at a different axial position than coil BX. As a matter of convenience for the system designer, the output of coil CXY can be nulled by including a receiver bucking coil connected in series and opposite polarity with coil CXY. This receiver bucking coil is shown at BXY. Methods of adjusting the axial position of receiver bucking coils such as BXY to null the output of the corresponding receiver coil CXY are well known in the art. The present embodiment of the invention includes cross-component coil CXY instead of merely using receiver coil RY for the same reason as coil CXY includes associated bucking coil BXY, namely that nulling the output of receiver coil RY to match transmitter coil TX in a non-conductive environment would require the use of an additional bucking coil for cross component detection, as well as the original bucking coil for direct detection of the signal from its associated transmitter coil (TY in this case). As a matter of convenience for the system designer the present embodiment includes separate cross-component coils such as CXY. It is to be understood that RY could be used for cross-component detection when combined with an appropriate bucking coil, and therefore the use of separate cross-component coils should not be construed as a limitation on the invention.

Another cross-axial receiver coil which can be included in the invention is shown at CXZ. Coil CXZ receives voltages induced along the Z-axis caused by eddy currents flowing in the earth formation as a result of current flowing through the X-axis transmitter coil TX (along X1). Coil CXZ can include a receiver bucking coil BXZ similar in function to bucking coil BXY. Adjusting the combined output of coils BXZ and CXZ to be zero in a non-conductive environment can be performed in a similar manner to that used to null the combined output of coils CXY and BXY in a non-conductive environment.

The electrical connections between the receiver coils and the receiver/signal processing/telemetry electronics unit (12 in FIG. 2) can be better understood by referring once again to FIG. 2. Receiver coil RX can be connected to the input of preamplifier 32. Receivers RY and RZ are connected, respectively, to the inputs of preamplifiers 34 and 36. Cross-axial receiver coil CXY and bucking coil BXY are series connected to the input of preamplifier 38. Cross-axial receiver coil CXZ and bucking coil BXZ are series connected to the input of preamplifier 40. Preamplifiers 32–40 are each selected to provide a signal output level compatible with the dynamic range of analog to digital converter portion of the ADC/DSP circuit connected the output of each preamplifier. As previously explained, each preamplifier 32, 34, 36, 38, 40 can be connected to an associated ADC/DSP 54, 52, 50, 48, 46.

The ADC/DSP's 54, 52, 50, 48, 46 each generate digital samples of the output of the preamplifier connected to it. The acquisition of the digital samples is timed by the controller 56. The controller 56 can be programmed to cause each associated ADC/DSP to generate digital samples of the output of the corresponding preamplifier. The controller 56 commands each ADC/DSP to generate a plurality of samples during each cycle of the alternating current flowing through each of the transmitter coils. These digital signal samples can be timed to have a predetermined phase with respect to the alternating voltages induced in each of the receiver coils RX, RY, RZ, CXY, CXZ. The significance of the timing of the digitization will be further explained.

Figure 4:
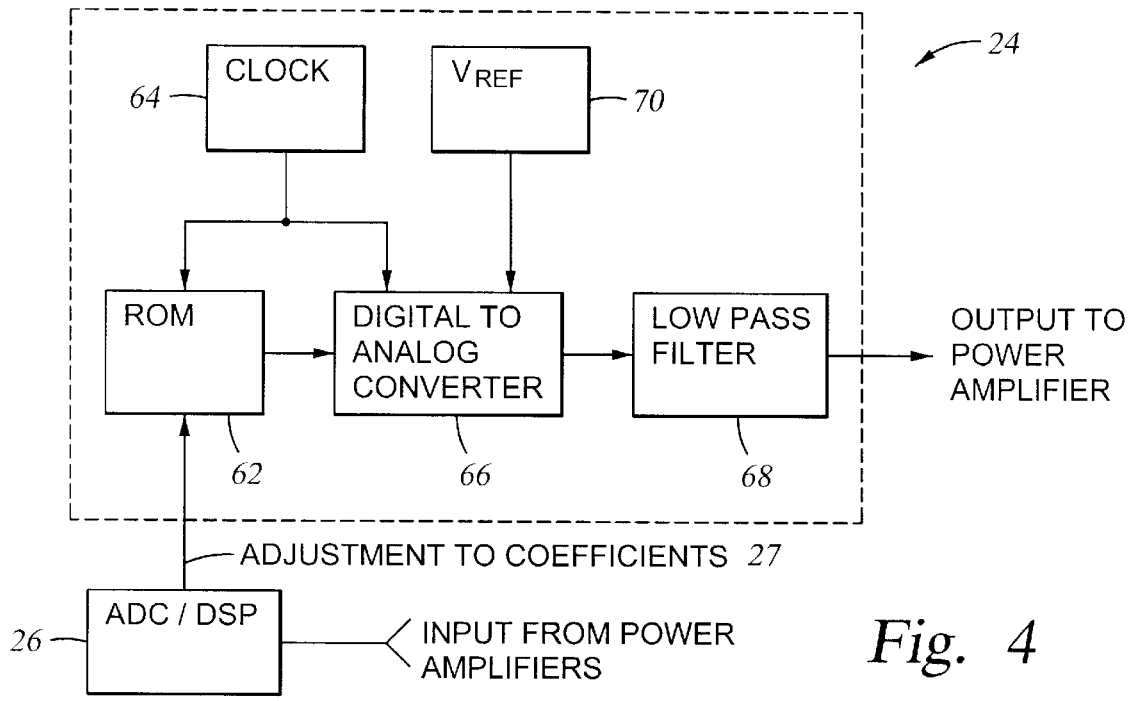
FIG. 4 shows a functional block diagram of a transmitter controller and signal generator for the instrument.

The hardware configuration of the instrument 10 having been explained, the timing and control of the power amplifiers (16, 18, 20 in FIG. 2) and the ADC/DSP's (54, 52, 50, 48, 46 in FIG. 2) will be explained in more detail. Referring now to FIG. 4, the transmitter controller 24 can include a read only memory (ROM) 62 which contains a digital representation of the desired waveform of the current to be passed through transmitter coils (TX, TY, TZ in FIG. 3A). The digital representation typically consists of numbers corresponding to the magnitude of the desired waveform sampled at spaced apart time intervals. The output of the ROM 62 is timed by a clock 64, which may form part of the transmitter controller 24, so that the numbers exit the ROM 62 at spaced apart time intervals and are conducted to a digital to analog converter (DAC) 66. The DAC 66 converts the numbers conducted sequentially from the ROM 62 into corresponding fractional amounts of a reference voltage source [$V_{ref}$] 70 connected to the DAC 66. The output of the DAC 66 then consists of analog voltages proportional to the numbers input from the ROM 62. Since the output of the DAC 66 changes in step with each new number conducted from the ROM 62, the DAC 66 would appear if graphed as a series of "stair-steps" The output of the DAC 66 is therefore preferably conducted to a low-pass filter 68 to smooth the "stair-step" like output of the DAC 66 into a continuous, smooth waveform. The output of the filter 68 can be conducted to the input of each power amplifier (16, 18, 20 in FIG. 2). It is to be understood that using the digital circuit just described herein for generating a driver signal for the power amplifiers 16, 18, 20 is a matter of convenience for the system designer and is meant only to serve as an example of circuits which could generate the desired transmitter current waveform. Analog signal generator circuits could as easily perform the required signal generation function.

As previously explained, a reference tap on each power amplifier 16, 18, 20 conducts a portion of the transmitter current to the ADC/DSP 26 in the auxiliary electronics unit 14. The ADC/DSP 26 generates digital samples of the transmitter current and conducts the samples to the transmitter controller 28. The transmitter controller 28 can calculate differences between the digitized samples of the transmitter current and the numbers stored in the ROM 62. These differences can include changes in amplitude and phase of the transmitter current with respect to the desired amplitude and phase of the transmitter current. These differences can be used to generate adjustment factors for the numbers stored in the ROM 62 so that the desired amplitude and phase can be more closely generated in the transmitter current. It is to be understood that analog circuitry known in the art can be used to perform the adjustments to the transmitter current waveform as just described. The use of the digital circuitry described herein for adjusting the transmitter current waveform is a matter of convenience for the system designer and is not meant to limit the invention. The changes calculated between the numbers in the ROM 62 and the digitized transmitter current can also include a number of cycles of the clock 64, whereby can be determined the actual phase of the transmitter current with respect to the apparent phase of the transmitter current waveform as synthesized by the numbers output from the ROM 62. It is contemplated that the clock 64 can have a sufficiently high frequency whereby this phase difference can be determined to a very high degree of precision. The number of clock cycles of phase difference can be conducted to the controller (56 in FIG. 2) in the telemetry unit (12 in FIG. 2) over a serial link, shown in FIG. 2 as 30B. The clock 64 can be used to operate both the transmitter controller 28 and the controller (56 in FIG. 2) so that generation of digital signal samples of the receiver voltages can be more accurately synchronized to the transmitter current.

A method of signal processing known as "frequency focusing" enables determination of the conductivity of the earth formations, particularly in directions along the X- and Y-axes, while substantially excluding the effects of eddy currents flowing in the wellbore (2 in FIG. 1). In a novel aspect of the invention, frequency focusing can be performed by having the transmitter current waveform include sinusoids at two different frequencies, combined in a predetermined relationship of amplitude and phase between each component frequency. The frequency for the transmitter current can be within a range of about 10–70 KHz for the first frequency and about 30–210 KHz for the second frequency, as will be further explained.

In the present embodiment of the invention, the transmitter current waveform, represented by $I_T$, should follow the relationship:

$$I_T = I_{T1} + I_{T2} \qquad (1)$$

where $I_{T1}$ and $I_{T2}$ represent, respectively, the transmitter current waveforms at the first $\omega_1$, and the second $\omega_2$ component frequencies, and where the relative amplitudes of $I_{T1}$ and $I_{T2}$ follow the relationship:

$$I_{T1} = I_0 \sin(\omega_1 t) \qquad (2)$$

$$I_{T2} = \left(\frac{\omega_1}{\omega_2}\right)^2 I_0 \sin(\omega_2 t)$$

where $I_0$ represents an arbitrary reference magnitude, typically proportional to the level of $V_{ref}$ (70 in FIG. 4). It is desirable for $\omega_2$ to be an odd-number harmonic multiple of $\omega_1$, and in the preferred embodiment, $\omega_2$ is the third harmonic. The transmitter current waveforms at the two component frequencies should have the same initial phase (zero) at the beginning of each cycle of the transmitter current at the first frequency. It has been determined that if the transmitter current follows the magnitude relationship described in equation (2), then the desired signal characteristics of the voltages induced in the receiver coils (RX, RY, RZ, CXY, CXZ in FIG. 3B) can be determined by directly measuring components of the induced voltages which have a certain time relationship with respect to the current flowing through the transmitter coils (TX, TY, TZ in FIG. 3A) at the first frequency. The components, at these times, of the voltages induced in the receiver coils by a two-frequency magnetic field having the frequency, phase and amplitude relationship described in equations , and 2 are inherently substantially insensitive to voltages induced by eddy currents flowing in the wellbore (2 in FIG. 1) and are substantially correspondent only to the magnitude of the eddy currents flowing only in the earth formations. By selecting the two component frequencies and relative amplitudes for the transmitter current waveform as described in equation (2), the conductivity of the earth formation can be directly related to the difference between the components of the induced voltages at each component frequency.

In this embodiment of the invention, the difference in the magnitudes of the components of the induced voltages at the two frequencies can be measured directly by programming the controller (56 in FIG. 2) to time acquisition of digital signal samples, represented by $t_n$, to occur twice during each full cycle of the transmitter voltage at the first (lower) frequency according to the expression:

$$t_n = \frac{(n + 1/2)\pi}{\omega_1} \qquad (3)$$

The digital samples of the induced voltages in the receiver coils made at these times will directly represent the difference in magnitude between the components of the induced voltage at each frequency. The digital signal samples made at these times can then be directly related to the conductivity of the earth formations.

Figure 5A:
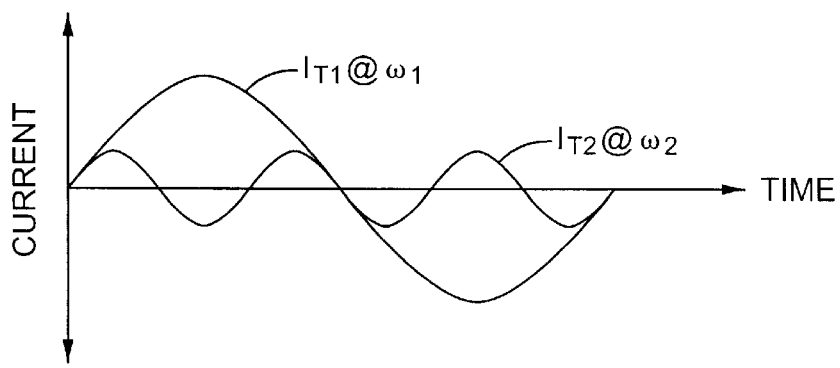
FIG. 5A shows a graph of the component frequencies of the transmitter current.
Figure 5B:
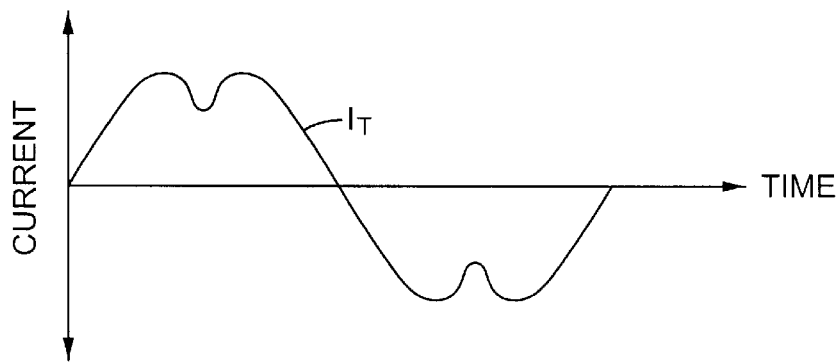
FIG. 5B shows a graph of the composite waveform of the transmitter current.
Figure 6A:
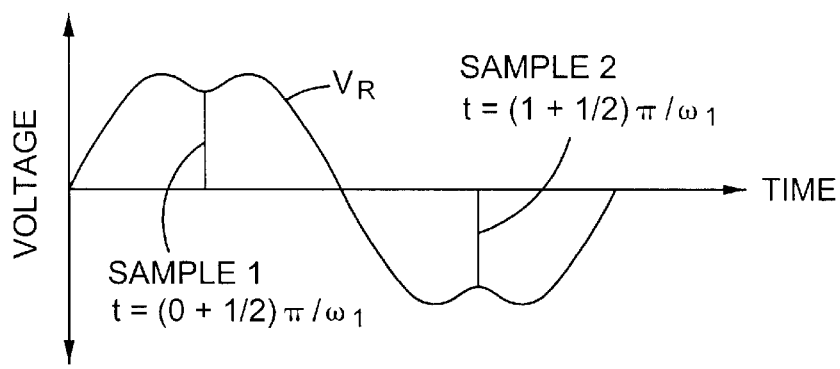
FIG. 6A show a graph of the voltage induced in the receiver coil as a result of the current shown in FIG. 5B flowing through the transmitter coil.
Figure 6B:
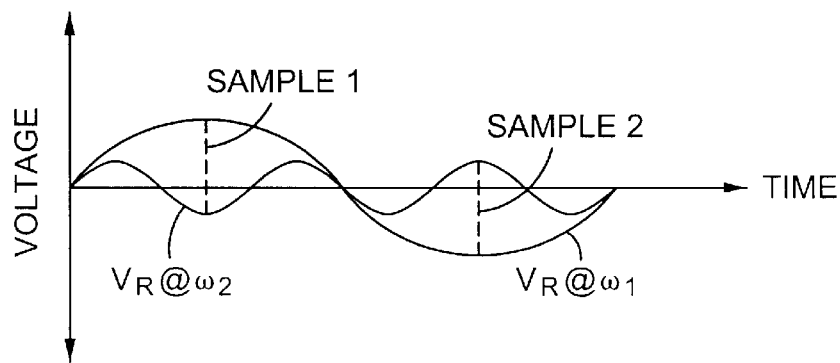
FIG. 6B shows the components of the voltage induced in the receiver and how digital samples made at certain times represents the difference in peak amplitude between the two components of the induced voltage.

The manner in which the magnitude of these digital signal samples directly represents the difference between the induced voltage magnitudes at the first and second component frequencies can be better understood by referring to FIGS. 5A, 5B, 6A and 6B. FIG. 5A shows a graph of each of the two frequency components of the alternating current flowing through the transmitter coil. The current magnitude at the first frequency is represented by curve $I_{T1}$, and the current magnitude at the second frequency is shown by curve $I_{T2}$. As previously explained, the second frequency can be the third harmonic multiple of the first frequency and have an amplitude relationship as previously described in equation (1). The composite current waveform is shown in FIG. 5B as $I_T$. The voltage which is induced in the receiver coil as a result of eddy currents flowing in the formation is shown in FIG. 6A, wherein the eddy currents are induced by the magnetic field generated by the current ($I_T$ in FIG. 5B) flowing through the transmitter coil. Digital signal samples can be made at times shown in FIG. 6A. Sample 1 is shown as timed to be at one-quarter cycle at the first frequency ($\frac{1}{2}\pi/\omega_1$). This time corresponds to n=0 in equation (3). Sample 2 is shown timed at three-quarter of the cycle at the first frequency ($3/2\pi/\omega_1$), which corresponds to n=1 in equation (3). The reason that digital samples made at these relative times represent the difference in magnitudes between the receiver voltage components at the first and at the second frequencies can be better understood by referring to FIG. 6B, which shows the receiver voltage as its individual frequency components: at the first frequency, shown by curve $V_R$ @ $\omega_1$; and at the second frequency, shown by curve $V_R$ @ $\omega_2$. If the alternating current were applied at each frequency individually to the transmitter coil, the voltage induced in the receiver coil would be shown by the individual component curves as in FIG. 6B. If the current at the second frequency has the frequency and timing relationship with respect to the current at the first frequency, as described herein, the induced voltage at the first frequency will reach a peak value at the times at which the induced voltage at the second frequency will reach a peak value but at the opposite polarity. Since the two frequencies of current are superimposed (passed through the transmitter simultaneously), samples of the voltage induced in the receiver coil taken at the times shown in FIG. 6B, such as SAMPLE 1 and SAMPLE 2, will therefore directly represent the difference between the peak magnitudes of the induced voltage components at the first and at the second frequency.

Referring once again to FIG. 2, when the instrument 10 is first energized, the transmitter controller 24 begins to generate a full cycle of the transmitter voltage waveform. The output of the transmitter controller 24, as previously explained, is conducted to the timer controller 22. In the preferred embodiment of the invention, X-, Y-, and Z-axis measurements can be conducted sequentially. The transmitter controller 24 can send a command signal to the timer controller 22 to cause it to actuate the particular power amplifier (such as X-axis amplifier 16) whose transmitter coil connected thereto corresponds to the axis along which the particular measurement is to be made. It is contemplated that a sufficiently precise measurement can be made by operating the transmitter controller through about 1,000 transmitter voltage waveform cycles at the first (lower) frequency, although this number of cycles is not to be construed as a limitation on the invention. For example, if the instrument 10 is to be moved relatively slowly through the wellbore (2 in FIG. 1), then a larger number of cycles may be useable in order to obtain higher accuracy measurements.

After the transmitter controller has operated through about 1,000 cycles, the transmitter controller 28 can instruct the timer controller 22 to operate another one of the amplifiers, such as Y-axis amplifier 18, to conduct the alternating current to its associated transmitter coil (TY in FIG. 3A). After about another 1,000 cycles, the transmitter controller 28 can instruct the timer controller to repeat the process for the remaining (Z-axis) power amplifier 20, and after about 1,000 cycles of alternating current have passed through the Z-axis transmitter coil (TZ in FIG. 3A), the entire process can be repeated.

During transmission from a particular transmitter coil, the controller 56 sends command signals to the ADC/DSP's 46–54 which are connected to the receiver coils which are to be detected during operation of each particular transmitter coil. For example, during operation of X-axis transmitter coil TX, ADC/DSP's 54 (connected to preamplifier 32, which is connected to X-axis receiver coil RX) and 48 (connected to preamplifier 38, which is connected to cross-component receiver coil CXY) and 46 (connected to preamplifier 40, which is connected to cross-component receiver coil CXZ) are instructed to digitize the output of the associated preamplifiers. The controller 56 can instruct the corresponding ADC/DSP's to generate digital signals samples at the exact times described in equation (3) with respect to the transmitter voltage. Alternatively, the ADC/DSP's can generate at least four samples for each cycle at the second (higher) frequency. Since the controller 56 and the transmitter controller 24 can be timed by the same clock (64 in FIG. 4), the exact time of generating the digital signal samples must be adjusted by the phase delay determined as previously described in the transmitter controller 24. The controller 56 can delay sending instruction to digitize the preamplifier output by the number of clock cycles of phase delay conducted from the transmitter controller 24 with respect to a start of transmitter voltage cycle command. The start of transmit cycle command can also be sent along the serial link 30B to indicate to the controller 56 that the transmitter controller 24 is initiating a transmitter voltage cycle. The digital signal samples acquired during the transmitter voltage cycle can be synchronously stacked, as previously described herein, and can be stored in a buffer (not shown separately) in the controller 56 for transmission to the surface by the telemetry transceiver 60, or can be retained for later processing. As previously described, the samples from each ADC/DSP 54–46 can be processed by a discrete Fourier transform to determine the magnitude of the voltage components at each frequency, or the samples made at the precise times described in equation (3) can be used to determine the difference in the in-phase voltage components directly.

After the previously described number of transmitter voltage cycles (which as previously explained can be about 1,000), the controller 56 can send digitization commands to the ADC/DSP associated with the receiver coil which will receive voltages induced by its axially associated transmitter coil (such as ADC/DSP 52 associated with coils RY and TY). The receiving and digitization process can then be repeated for the remaining transmitter coil and axially associated receiver coil.

2. Processing transverse induction signals into an estimate of the axial positions of formation layer boundaries The first step in the method of the invention is to calculate a second derivative, with respect to axial position (wellbore depth), for the receiver signals measured by either the X-axis (RX in FIG. 3A) or the Y-axis (RY in FIG. 3A) receiver coils. The receiver signal should be the one measured from the magnetic field generated by the transmitter coil oriented along the same axis as the receiver coil. If the signal from the RX receiver coil is used, it should correspond to alternating current passed through the X-axis transmitter coil (TX in FIG. 3A). Similarly, if the signal from the RY receiver coil is used, it should correspond to the alternating current being passed through the Y-axis transmitter coil (TY in FIG. 3A). Such receiver signals are generally transverse to the axis of the instrument and are parallel to the boundaries of the earth formation layers. These signals can be generally characterized as "transverse" induction signals.

In the invention, the receiver signal used for calculating the second derivative should be measured using only a single frequency alternating current passing through the corresponding transmitter coil, rather than the special two-frequency alternating current described earlier herein. As will be further explained, the method of the invention can be repeated for transverse induction measurements made at a plurality of different individual alternating current frequencies to enhance the reliability of the results.

Figure 7:
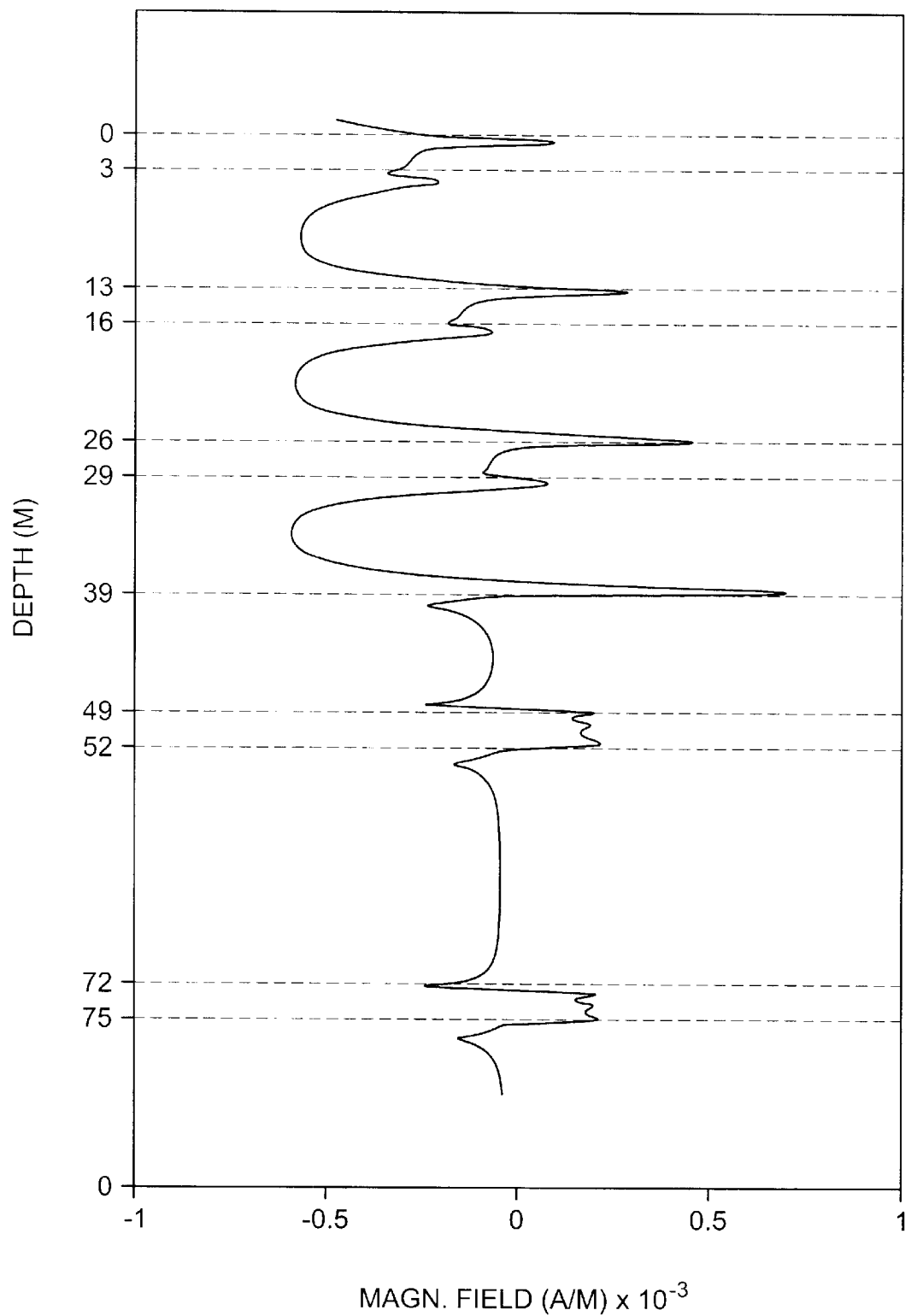
FIG. 7 shows a synthesized voltage response of the X-axis receiver coil to the X-axis transmitter in a simulated earth formation having anisotropic layers embedded in an isotropic earth formation.

An example of the response of the RX receiver coil to the magnetic field generated by the TX transmitter at an alternating current frequency of 20 KHz is shown in FIG. 7. FIG. 7 represents a synthesized response of the RX receiver coil to a simulated earth formation having five, 3 meter thick anisotropic layers embedded in an isotropic surrounding earth formation. The axial positions of the anisotropic layers are indicated on the depth scale on the left-hand side of the graph in FIG. 7. The layers are generally transverse to the axis of the instrument. The synthetic signals were corrupted with Gaussian distributed random noise having a standard deviation of about 0.66 $\mu$A/m. The relative amplitude of the noise with respect to the signal amplitude increases with respect to the depth within the modeled earth formations.

Figure 8:
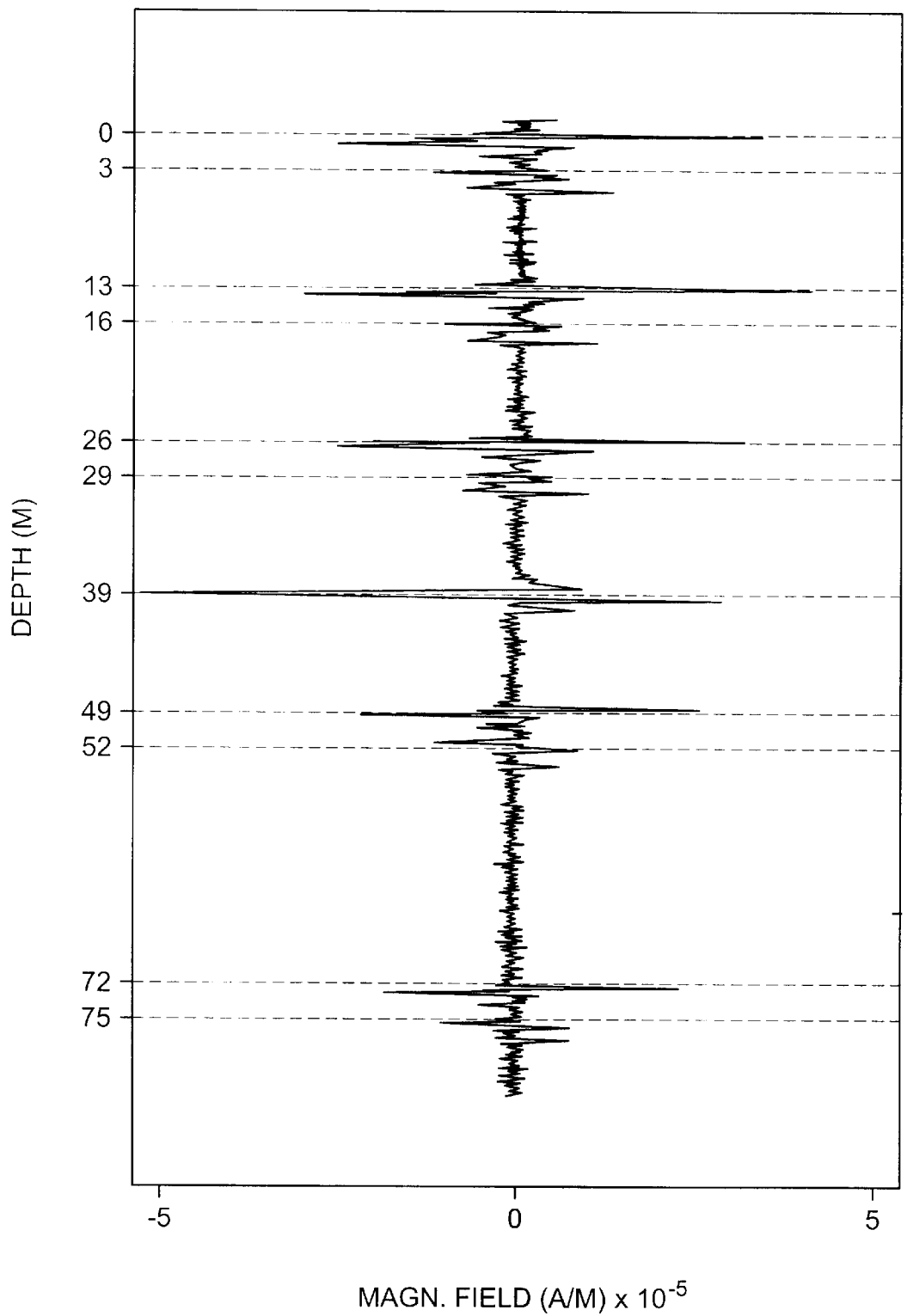
FIG. 8 shows a second derivative with respect to depth of the synthetic voltage response shown in FIG. 7.

The second derivative of the RX receiver coil response is shown over the same modeled earth formations in FIG. 8. The second derivative with respect to depth can be stored in a depth-referenced file similar in form to the depth-referenced files in which the "unprocessed" receiver voltage signals are recorded for processing. Such file formats are well known in the art.

Figure 9:
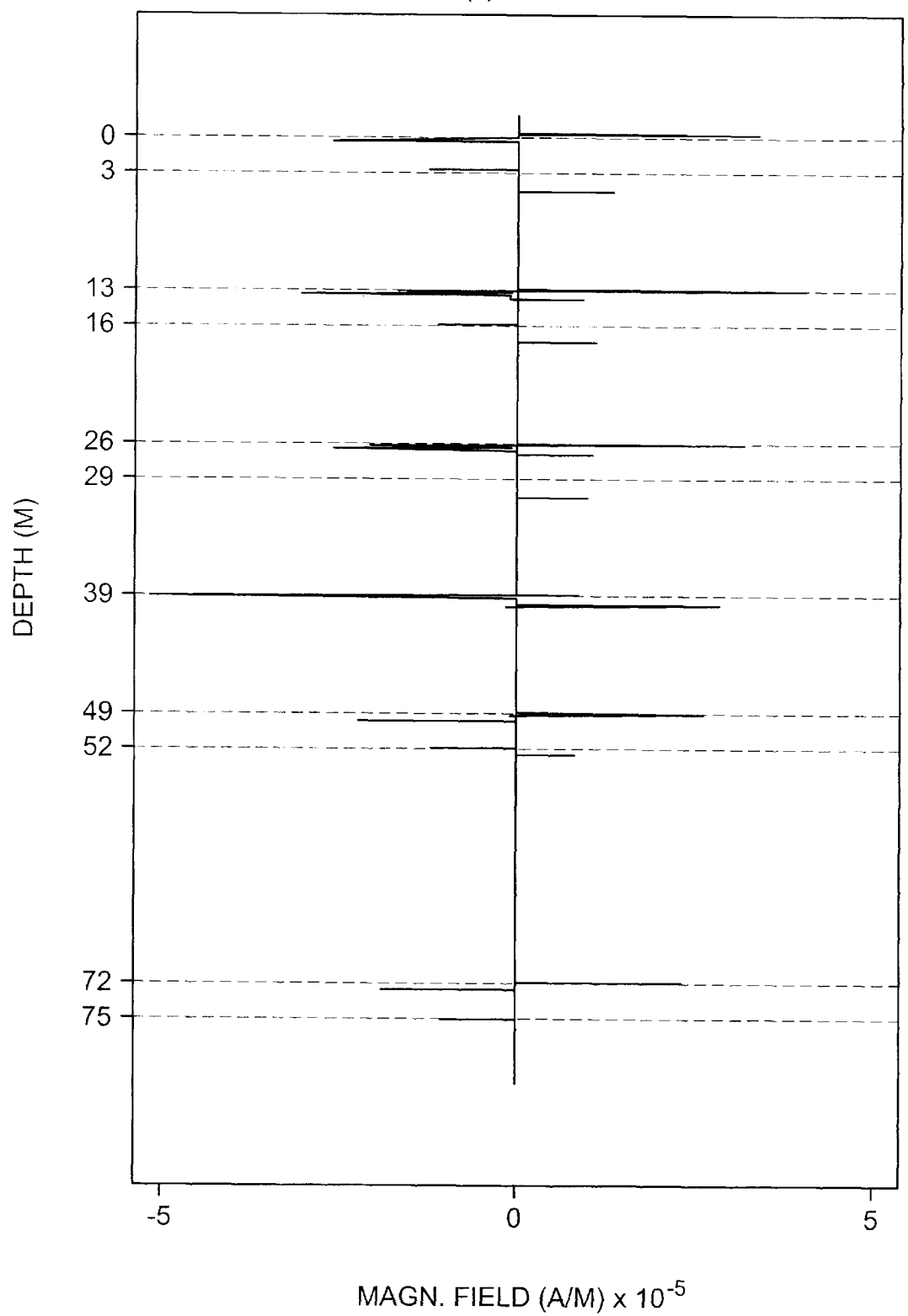
FIG. 9 shows the second derivative curve in FIG. 8 after muting.

The next step in the method of the invention is to "mute" the second derivative values to reduce the effects of noise and enhance the reliability of the results. An example of muting is shown in FIG. 9. Values of the second derivative which exceed a selected threshold are retained, while all values of the second derivative which fall below the threshold are set to zero.

Then a first derivative with respect to depth can be calculated from the same receiver signals used to calculate the second derivative. The first derivative values are scanned with respect to depth. At each axial (depth) position where the first derivative changes sign (passes through zero), the value of the second derivative is examined. If the value of the second derivative is non-zero at any position where the first derivative changes sign, a bed boundary is inferred. The inferred bed boundary can be written as a non-zero value indication to a depth-referenced file.

Locations of bed boundaries inferred from the first and second derivatives can then be filtered to eliminate locations unlikely to have a bed boundary. This procedure can be referred to as "thickness" filtering. A minimum thickness threshold related to the axial spacing between the transmitter and receiver coil can be selected. The receiver voltage measurements used in this invention have a minimum axial resolution which is related to the axial spacing between the transmitter and receiver coils used to make the measurements. Layer boundary indications which occur at axial positions separated from the previous layer boundary indication, by less than the minimum thickness threshold, can be removed from the layer boundary indication file.

Figure 10:
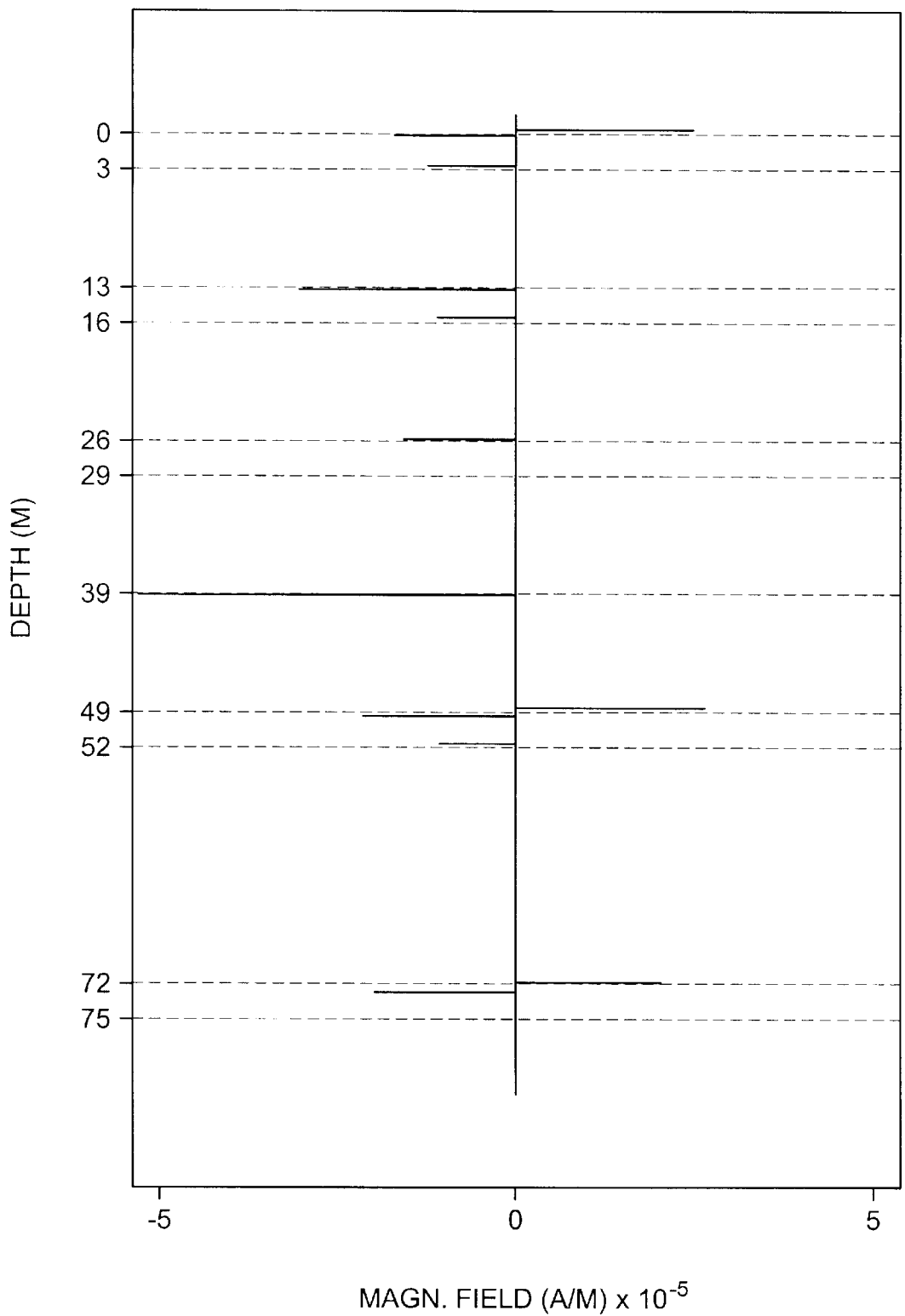
FIG. 10 shows the muted second derivative curve in FIG. 9 after thickness filtering.

After the minimum thickness filter is applied, it is desirable to filter out any layer boundary indications having axial separations from the previous layer boundary indications of 0.6 and 1.6 meters, when using the instrument coil arrangement shown in FIGS. 3A and 3B. The values of 0.6 and 1.6 meters represent the spacing between the transmitter coil (TX in FIG. 3A) and main receiver coil (RX in FIG. 3A), and the spacing between the transmitter coil TX and the bucking coil (BX in FIG. 3B). The spacing values used for this filtering step will depend on the actual spacing between the transmitter and receiver coils whose signals are used for layer boundary detection, so the 0.6 and 1.6 meter spacings are not meant to strictly limit the invention. An example of the layer boundary response after the steps of thickness filtering is shown in FIG. 10.

To further improve the results of the method, the entire procedure can be repeated using single-frequency receiver voltage signals, from the same receiver coil (based on the magnetic field generated by the same transmitter coil), but made at a different alternating current frequency. The instrument disclosed herein includes the capability to make induction voltage measurements at a plurality of individual and combined frequencies within a range from about 10 to 210 KHz. Layer boundaries inferred from the thickness-filtered first and second derivatives, made at each individual frequency, can be compared to the layer boundary inferences from the measurements at each other frequency. Layer boundary inferences appearing in the calculations made from signals measured at more than one different frequency can be selected as the locations of layer boundaries for further processing such as by inversion.

DESCRIPTION OF AN ALTERNATIVE EMBODIMENT

Figure 11:
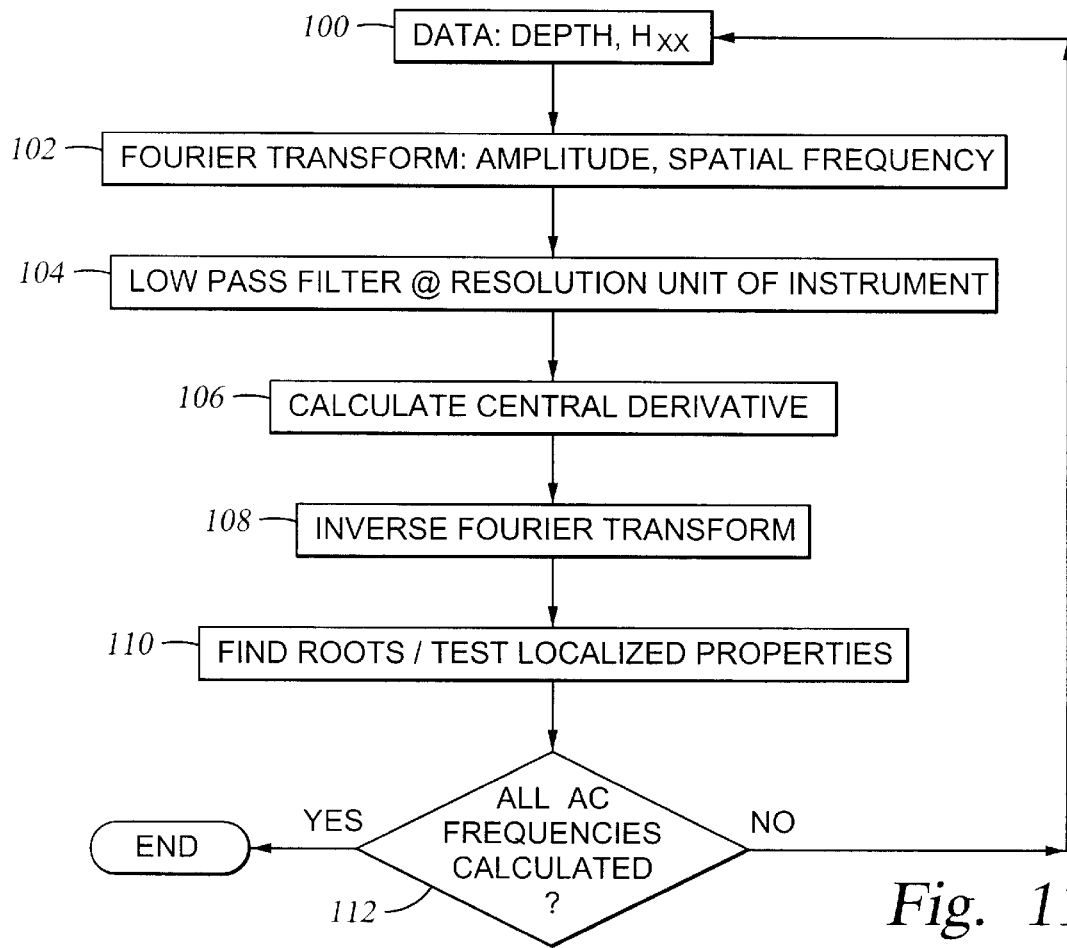
FIG. 11 is a flow chart of an alternative embodiment of the invention.

An alternative embodiment of the invention includes calculation of a first derivative of the transverse induction receiver measurements in the spatial frequency domain. The transverse induction measurements can be made from the same transmitter and receiver coils as for the first embodiment of the invention. Similarly as for the first embodiment of the invention, the transverse induction measurements are preferably made at a single alternating current frequency. This is shown in FIG. 11 in box 100. The first step in this embodiment of the invention is to convert the transverse induction measurements with respect to depth into the spatial frequency domain by using a Fourier transform. The term "spatial frequency" is stated here to avoid confusion with the frequency of the alternating current used to make the induction measurements. The output of the Fourier transform will include relative amplitude and phase of the induction signals with respect to spatial frequency. The Fourier transform is shown in box 102 in FIG. 11.

The Fourier transformed transverse induction measurements should then be filtered using a low pass filter with a band limit corresponding to the axial resolution of the logging instrument. As explained in the previous embodiment of the invention, the axial resolution will be related to the axial spacing between the transmitter and receiver coil used to make the induction measurements. The low pass filter should include a taper at the band limit to reduce the magnitude of artifacts in the processed results known as Gibb's ringing. The step of low pass filtering is shown in box 104 in FIG. 11.

The next step in this embodiment of the invention is to calculate a central derivative of the filtered, Fourier transformed signals. This step can be described as follows. The induction signals are recorded as a series of discrete values with respect to depth, with the depth interval generally being equal between each recorded depth. The Fourier transform will typically be a discrete Fourier transform. Therefore the coordinates in the Fourier transform will be represented by discrete individual frequency values. Calculating a central derivative includes calculating a value of induction voltage which would obtain at about one-half depth level above, and one-half depth level below each recorded depth level in the recorded voltage signals. The value of induction voltage which would obtain at one-half depth level either above or below each recorded depth level can be calculated by applying an appropriate phase shift to the Fourier spectrum. Then, the Fourier transform of the difference between the one-half depth level shifted values, and the values of induction voltage which would obtain one full depth level above or below each of the one-half depth level shifted values can be calculated using a formula shown for example in, H. Joseph Weaver, "Applications of Discrete and Continuous Fourier Analysis", John Wiley and Sons, New York (1983) p. 91–96. Then the inverse Fourier-transforming of the difference spectrum is calculated. The inverse Fourier transform of the difference spectrum results in the central difference approximation of the numerical derivative of the voltage signals at each recorded point in the depth (space) domain. The calculation of the central derivative is shown in FIG. 11 in box 106. The result is an approximation of the first derivative of the original induction measurements filtered to remove any layer boundary indications at an axial spacing less than the axial resolution of the instrument. The step of inverse Fourier transforming is shown in box 108 in FIG. 11.

Formation layer boundaries can be inferred at each location where the first derivative passes through a value of zero (the "roots" of the derivative). The roots of the derivative will typically indicate all the layers in the formation, but may include layer indications which do not correspond to a true layer boundary. To verify the nature of layer boundary indications as representing a true layer boundary, localized properties of the derivative can be tested. Localized properties refers to changes in the value of the induction measurements or the derivative within a few depth levels of the depth level of interest. These localized properties can include peak widths, the integral surface under the peak, and the axial range of consistent (directionwise) change in the value of the first derivative. For example, all peaks or troughs narrower than four contiguous depth level points can be discarded as not being representative of a true layer boundary. Similarly, change in value of the first derivative which does not continue in the same direction (increasing or decreasing in value) of less than about four data points can be discarded. Testing the localized properties is shown in box 110 in FIG. 11.

The system operator may wish to test the results by recalculating the axial positions of layer boundaries using single alternating current frequency measurements made at each of the other different alternating current frequencies, just as for the first embodiment of the invention. This is shown in decision box 112 in FIG. 11. It should be noted that this embodiment of the invention typically does not miss any layer boundaries at any individual alternating current (AC) frequency, so the step of repeating the process at different AC frequencies should be considered optional.

Those skilled in the art will devise other embodiments of the invention which do not depart from the spirit of the invention as disclosed herein. Accordingly, the invention should be limited in scope only by the attached claims.

What is claimed is:

1. A method for estimating axial positions of formation layer boundaries from transverse electromagnetic induction signals measured at a selected frequency, comprising:

calculating a first derivative with respect to depth of said transverse induction signals;

calculating a second derivative with respect to depth of said transverse induction signals;

muting said second derivative;

selecting layer boundaries at axial positions where said muted second derivative is not equal to zero and where said first derivative changes sign;

thickness filtering said selected layer boundaries.

2. The method as defined in claim 1 further comprising repeating said steps of calculating said first and said second derivatives, muting, selecting and filtering, for transverse induction measurements made at a different alternating current frequency than said selected frequency, and selecting locations of layer boundaries where said thickness filtered selected layer boundaries occur at the same axial position for both said frequencies.

3. The method as defined in claim 1 wherein said step of thickness filtering comprises eliminating ones of said selected boundaries having an axial spacing equal to a spacing between an induction transmitter and an induction receiver used to measure said transverse induction signals.

4. The method as defined in claim 1 wherein said step of thickness filtering comprises eliminating ones of said selected boundaries having an axial spacing less than an axial resolution of said transverse electromagnetic induction signals.

5. A method for estimating axial positions of formation layer boundaries from transverse electromagnetic induction signals measured at a selected frequency, comprising:

Fourier transforming said signals into the spatial frequency domain;

low pass filtering said Fourier transformed signals at a cutoff about equal to an axial resolution of said induction signals;

calculating a central first derivative of said filtered Fourier transformed signals;

calculating an inverse Fourier transform of said central first derivative;

selecting roots of said inverse Fourier transformed central first derivative; and testing localized properties of said inverse Fourier transformed central first derivative within a selected number of data sample points of said roots, thereby providing indications of formation layer boundaries at axial positions most likely to be true ones of said formation layer boundaries.

6. The method as defined in claim 5 further comprising repeating said steps of Fourier transforming, low pass filtering, calculating said central derivative, inverse Fourier transforming, selecting said roots and testing said localized properties for transverse electromagnetic induction signals measured at a different frequency than said selected frequency.

* * * * *